United States Patent

Maggio, Jr.

[15] 3,671,945

[45] June 20, 1972

[54] DATA MESSAGE CONTROL SYSTEM

[72] Inventor: Anthony F. Maggio, Jr., Oklahoma City, Okla.

[73] Assignee: Honeywell Information Systems Inc.

[22] Filed: Sept. 2, 1970

[21] Appl. No.: 68,868

[52] U.S. Cl. ....................340/172.5, 340/146.1 BA

[51] Int. Cl. ....................G08c 25/02

[58] Field of Search ....................340/146.1, 172.5

[56] References Cited

UNITED STATES PATENTS

| | | | |
|---|---|---|---|
| 3,284,774 | 11/1966 | Leonard et al. | 340/172.5 |
| 2,805,278 | 9/1957 | Van Duuren | 340/146.1 X |
| 2,970,189 | 1/1961 | Van Dalen et al. | 340/146.1 X |
| 3,388,378 | 6/1968 | Steeneck et al | 340/146.1 |
| 3,452,330 | 6/1969 | Avery | 340/172.5 |
| 3,541,523 | 11/1970 | Bidlack et al. | 340/172.5 |

*Primary Examiner*—Paul J. Henon
*Assistant Examiner*—Sydney R. Chirlin
*Attorney*—George V. Eltgroth, Edward W. Hughes, George R. Powers, Frank L. Neuhauser, Oscar B. Waddell and Joseph B. Forman

[57] ABSTRACT

A system for controlling the transmission of data messages from a data handling device having a memory and data input apparatus such as a keyboard to a receiving station such as a central processor, the system (1) controlling the transmission to the receiving station of identifying data and a stored data message in response to transmit signals, (2) preventing input of data to the memory during the period of time between an initial transmit signal and a subsequent message acknowledgement from the receiving station, and (3) changing the message identifying data in response to the message acknowledgement such that successive data messages will be prefaced with different message identifying data.

14 Claims, 4 Drawing Figures

INVENTOR.
ANTHONY F. MAGGIO JR.
BY George R. Powers
ATTORNEY

DATA MESSAGE CONTROL SYSTEM

BACKGROUND OF THE INVENTION

1. Field of the Invention

This invention relates to the transmission of data messages between separate data handling devices and, more particularly, to a data message control system capable of identifying successive data messages such that the receiving station can readily distinguish between successive transmissions of an unchanged data message and successive transmission of different, but possibly identical, data messages.

2. Description of the Prior Art

Information processing systems commonly include a number of data handling devices between which information is transmitted in the form of pulses or signals by means of suitable communication equipment such as telephone lines and the like. Such systems typically include one or more remote terminals, such as a card reader or a keyboard-cathode ray tube (CRT) terminal, and a central processor. While the more usual flow of information in such a system is between the individual terminals and the central processor, data may also be transmitted between two or more terminals. The present invention is concerned with the control of data input to the memory of a terminal and the transmission of data messages from the memory of the terminal to a receiving station, which may be either a central processor or another terminal.

The communication facilities over which data is transmitted in information processing systems of the type just discussed are frequently subject to sporadic noises which can introduce errors into the data messages. Various well-known techniques are available for detecting such errors and either correcting the errors or commanding the transmitting station to retransmit the data message. The equipment required for implementation of an error detection and correction scheme is typically complex and expensive. For this reason, error detection and correction are not in common use in low to medium cost communication systems. Error detection and retransmission schemes, however, are relatively simple and inexpensive to implement and are, therefore, subject to rather wide commercial use.

Error detection and retransmission systems of the type known heretofore have included means for preventing further input of data to the memory of the transmitting station between the time of an initial transmit signal or command and a subsequent signal from the receiving station that the message has been received without apparent error. In the absence of an acknowledgement from the receiving station or upon the reception of a signal from the receiving station indicating the rejection of the message because of an apparent error, the unchanged message stored in the memory is retransmitted. This retransmission can occur as many times as necessary until a message acknowledgement signal is received by the transmitting station. Occasionally, however, a message acknowledgement signal transmitted by the receiving station may be lost due to obliteration by noise. Since the data transmitting station does not receive the message acknowledgement signal, it retransmits the data message even though the message has already been accepted by the receiving station. If the retransmitted message is accepted again by the receiving station, substantial errors can be introduced since data processing systems have heretofore been incapable of determining if the second message is a duplicate of the first message or a separate message having identical content. By way of example, let it be assumed that a customer purchases an item and that details of the sale, including the price and instructions or charge the customer's account, are transmitted to a central data processor from a remote point-of-sale terminal. If the first transmission of the sales data reaches the central processor in acceptable form, the customer's account will be charged for the amount of the sale. Then, if the message acknowledgement signal should be lost in transmission, a retransmission of the sales data would result in a second charge for the same merchandise. While it is conceivable to instruct the receiving station to reject a second identical message, it has been found that such an approach is not an acceptable solution to the problem of redundant transmissions since successive identical messages may represent separate transactions. Let it be assumed, for example, that the hypothetical customer described above wished to purchase two identical items. A rejection of a second message transmitting data concerning the second item would result in the customer getting the two items for the price of one.

SUMMARY OF THE INVENTION

It is, therefore, a primary object of this invention to provide an improved system for controlling the transmission of data messages between transmitting and receiving stations of a data processing system.

Another object of this invention is to provide a data message control system that is capable of distinguishing between duplicate messages and separate messages having identical content.

Yet another object of this invention is to provide an improved data message control system for preventing the further input of data to the transmitting station during the period of time between an initial transmit signal and a subsequent message acknowledgement from the receiving station.

Briefly stated, in carrying out the invention in one form, a data handling device having a memory for storing data and input means for supplying data messages to the memory for subsequent transmission to a receiving station includes a message control system having means for receiving transmit signals and message acknowledgement signals. The message control system further includes means responsive to the initial transmit signals to inhibit further input of data to the memory and means responsive to the initial transmit signal and each subsequent signal to transmit the data message stored in the memory. In accordance with the invention, means are provided for generating and transmitting predetermined identifying data ahead of each message and for changing the identifying data in response to message acknowledgement signals. In this manner, a duplicate transmission of a message can be readily identified by the receiving station since the second transmission of the message will have the same identifying data as the first transmission. A separate message having identical content, however, will be recognized as a separate message since it will have different identifying data.

By a further aspect of the invention, the means for establishing the predetermined identifying data includes a bi-stable circuit means, or flip-flop, having first and second stable states. Message acknowledgement signals are supplied to the flip-flop such that its state is shifted by each message acknowledgement signal. Means are provided for transmitting to the receiving station ahead of each data message an indication of the state of the flip-flop, the indication of the state of the flip-flop thus serving as identifying data. Since the state of the flip-flop is shifted by each message acknowledgement signal, alternate states of the flip-flop will be indicated for successive messages.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DESCRIPTION OF PREFERRED EMBODIMENTS

Before proceeding with a description of the data message control system of this invention as illustrated by the Figures, it will be well to briefly comment on the terminology used herein and the general characteristics of well-known logic elements used in the illustrated circuit. Signals will be described as being high or enabling signals and low or disabling signals. In a binary or digital sense, a high or enabling signal transmitted to or from the memory of the data handling device or to the receiving station will be considered to represent the digit "1" while a low or disabling signal will be considered to represent the digit "0." It will be obvious, of course, that such conventions could be reversed and that the terms "high" and "low" are merely relative terms.

The logic utilized in the illustrated embodiment of the invention is of conventional nature. That is, an "AND gate" is a multiple input logic element which provides at its output a high or enabling signal when each of its input signals are high or enabling signals. An "OR gate" is a multiple input logic element which provides a high or enabling output signal when one or more of its input signals is a high or enabling signal. The term "flip-flop," as used in the present description, designates a bistable logic element having two stable states being a set state in which there is a binary "1" digit or a high or enabling signal at its "1" output terminal and a binary "0" digit or a low or disabling signal at its "0" output terminal and a reset state in which there is a binary "0" or low or disabling signal at its "1" output terminal and a binary "1" digit or a high or enabling signal at its "0" output terminal.

A "one-shot" multi-vibrator as utilized in the present invention is a two-state circuit which is normally in a stable reset state. A suitable input signal triggers the one-shot to its astable set state, which state it maintains for a predetermined design period, after which it automatically returns to its reset state. An example of such a one-shot circuit is shown by Abraham I. Pressman in FIG. 11-15 of *Design of Transistorized Circuits for Digital Computers*, John F. Rider Publisher, Inc., New York, 1959.

Figure 1A:
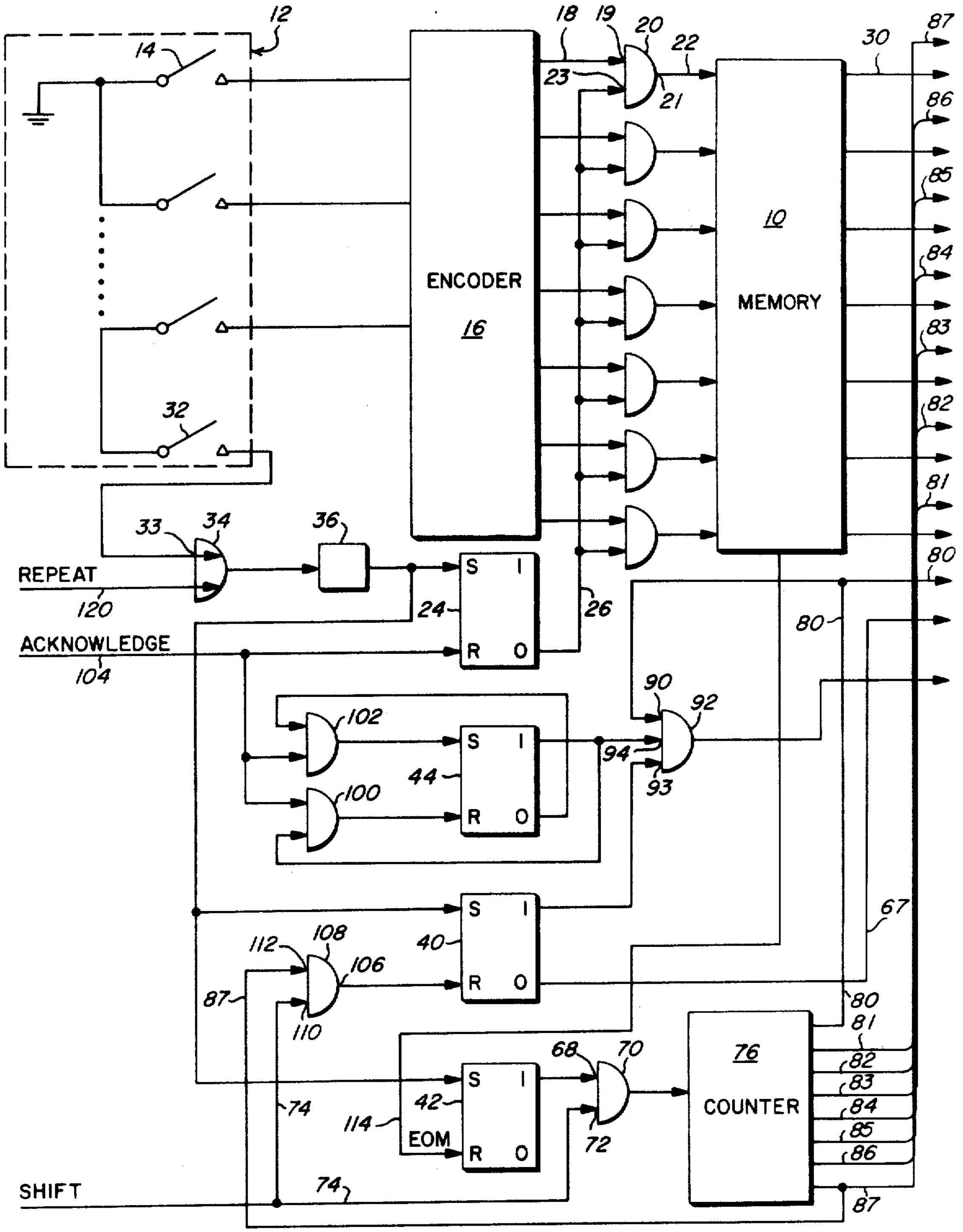
FIGS. 1*a* and 1*b* are circuit diagrams illustrating a preferred embodiment of the invention.
Figures 1B, 1C, 2:
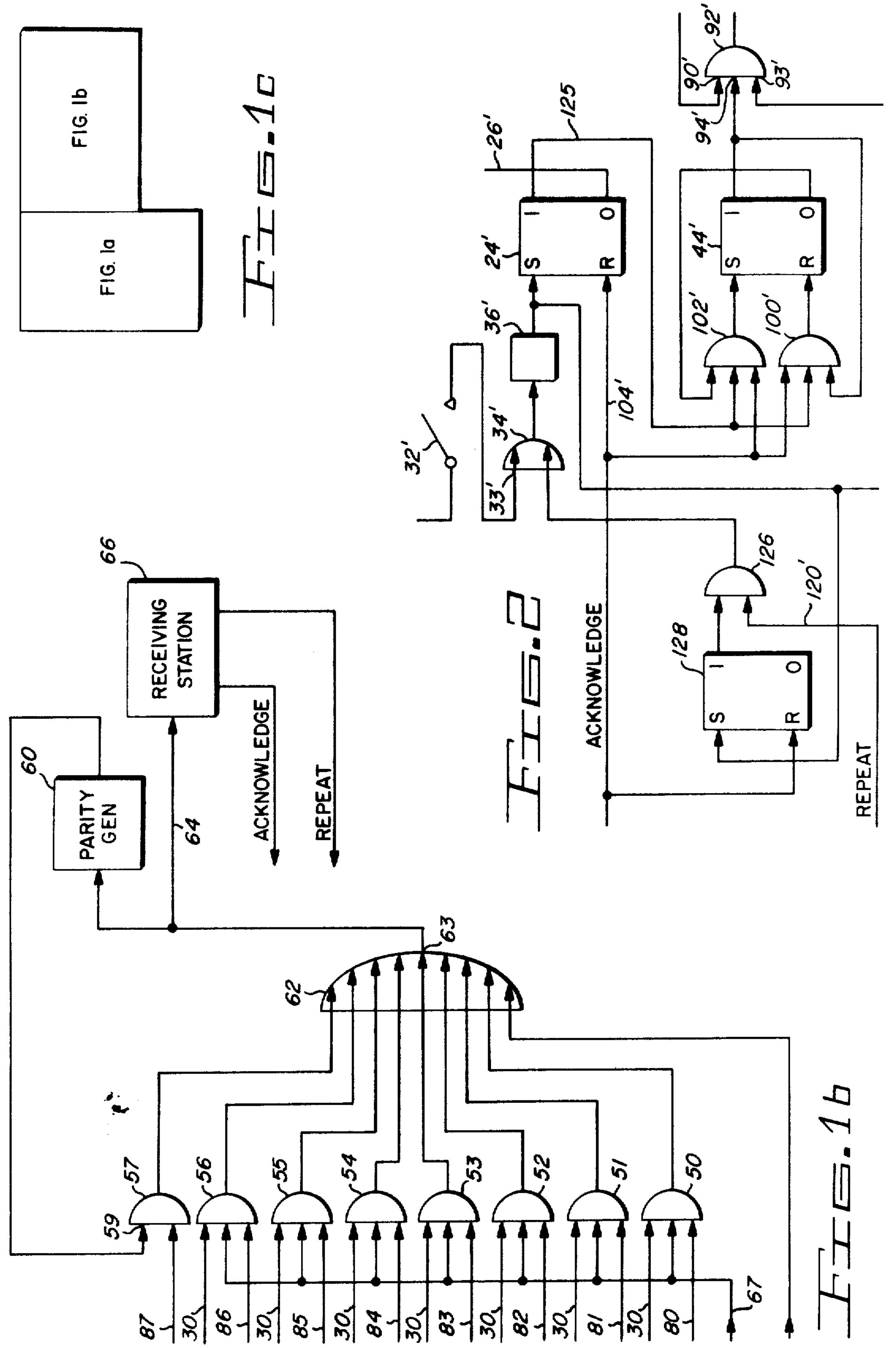
FIG. 1*c* illustrates the relationship between FIGS. 1*a* and 1*b*.
FIG. 2 is a fragmentary circuit diagram showing a modification in the circuit portion of FIG. 1.

Referring now to FIGS. 1*a*, 1*b* and 1*c*, the circuitry of a data handling device required for implementation of the present invention in a preferred from is illustrated, the data handling device including a memory indicated generally by the numeral 10 and data input apparatus indicated generally by the numeral 12. The illustrated data input apparatus includes a number of switches 14 each representing a discrete piece of information such as the letters of the alphabet, numerals from 0 to 9, and various symbols. Individual switches can also be utilized to convey more complex information such as "Add," "Charge,"etc. The switches 14 may be actuated by any suitable means, such as by manually operated keys on a keyboard or by various automatically operated devices such as would be utilized in a card reader and the like. When one of the switches 14 is closed, a corresponding signal is supplied to an encoder 16, within which the signal from the switch 14 is translated into a unique pattern of high and low (or "1" and "0") signals supplied over a number of output lines 18 to inputs 19 of a respective number of AND gates 20. The other input 23 of each of the memory input AND gates 20 is connected to the "0" output terminal of a bi-stable circuit element or flip-flop 24 by line 26, and the output 21 of each of the AND gates 20 is connected to the memory 10 by a line 22. If the flip-flop 24 is in its reset state, the input 23 of each AND gate 20 is enabled so that high and low signals supplied to the other input 19 will be transmitted through the AND gate 20 to the memory 10. During data entry, the flip-flop 24 is in its reset state so as to permit the unrestricted entry of data to the memory 10.

The memory 10 may be of any one of several well-known types, its details not forming part of the present invention. As illustrated, the memory 10 is capable of accepting input of signals over lines 22 and providing data output signals over lines 30 in a manner to be described hereinafter. As an example of a suitable memory of the recirculating delay line type, attention is directed to U.S. Pat. No. 3,493,938 to Cuccio, issued Feb. 3, 1970, and assigned to the assignee of this invention.

Upon the completion of the entry of a desired data message into the memory 10 from the input apparatus 12, a switch 32 is closed either manually or automatically to supply an enabling transmit signal to the input 33 or an OR gate 34, which in turn transmits an enabling signal to a one-shot multi-vibrator 36. The resulting output enabling signal of the "one-shot" 36 is supplied to the input set "S" terminal of the flip-flop 24 to shift the state of the flip-flop 24 to its first or set stable state. The enabling signal previously supplied to the input 23 of the memory input AND gates is changed by the shift in state of the flip-flop 24 into a low or disabling signal. As long as the flip-flop 24 remains in its set condition, further input of data to the memory 10 will be prevented since the input 23 of each AND gate 20 is disabled. This prevents any change in the stored data message until a message acknowledgement signal is received in accordance with the following description.

The enabling or high output signals from the "one-shot" 36 is also supplied to the respective input set "S" terminals of bistable circuit elements or flip-flops 40 and 42 to shift both of these flip-flops to their first or set conditions. The control system includes a toggle flip-flop 44 which is not shifted in response to the enable signal generated by the "one-shot." The flip-flop 44 remains in its previous state; let it be assumed for the purposes of this description that the flip-flop 44 is initially in its first or set condition.

The control system also includes a number of memory output AND gates 50-56 each having a first input connected to the memory 10 by a line 30 for receiving data signals therefrom and an AND gate 57 having an input 59 connected to a parity generator 60. Each of the memory output AND gates 50–56 has a second input connected to the "0" output terminal of the flip-flop 40 by line 67. Each of the AND gates 50–57 has an output connected to an OR gate 62, the output 63 of which is connected to a communication facility 64 leading to the receiving station 66. It will be obvious that transmission of binary data from the memory 10 to the receiving station through the AND gates 50–56 will be inhibited as long as the flip-flop 40 is in its first or set state since a low or disabling signal is being supplied therefrom to each of the AND gates.

The "1" output terminal of the flip-flop 42 is connected to an input 68 of an AND gate 70. Pulses, designated SHIFT in FIG. 1, at the normal clock rate of the communication system are continuously supplied to the other input 72 of the AND gate 70 over line 74. As long as flip-flop 42 is in its set condition, the shift pulses will be transmitted through the AND gate 70 to to suitable counting apparatus indicated generally by the numeral 76. The counting apparatus provides in a well-known manner a cyclic sequence of regular counting signals, there being as many separate counting signals as there are bits in each data character where one and only one signal is enabled at a time. The encoder 16 provides seven high or low signals for each character and the parity generator 60 adds an eighth high or low signal depending upon the number of "1's" and "0's" in the code generated by the encoder 16 so that there will always be an odd number of "1's." Accordingly, the counter 76 provides a cyclic sequence of eight counts, count 1 being represented by a high signal on line 80 only, count 2 being represented by a high signal on line 81 only at a predetermined later time, etc. As long as the flip-flop 42 remains in its set state, count 8 as represented by a high signal on line 87 only will be followed by a repetition of the sequence beginning with count 1.

Line 80 from the counter 76 is connected to a third input of the memory output AND gate 50, line 81 is connected to AND gate 51, etc. Line 87 is connected to a second input of AND gate 57. These connections mean that signals can be transmitted through only one of the AND gates 50–57 at any given time since only one of the counting inputs can be enabled at any given time.

Line 80 over which counting signal 1 is transmitted is also connected to the input 90 of an AND gate 92. A second input 93 is connected to the "1" output terminal of the flip-flop 40, and a third input 94 is connected to the "1" output terminal of the flip-flop 44. A pair of AND gates 100 and 102 are provided in conjunction with the flip-flop 44, AND gate 100 having one input connected to the "1" output terminal and AND gate 102 having one input connected to the "0" output terminal. The other inputs of the AND gates 100 and 102 are connected to line 104 for receiving therefrom message acknowledgement signals designated ACKNOWLEDGE generated by the receiving station 66. The ACKNOWLEDGE signal is also connected to the reset "R" terminal of the flip-flop 24.

The reset "R" input terminal of the flip-flop 40 is connected to the output 106 of an AND gate 108 having a first input 110 connected to line 74 for receiving therefrom shift pulses at the regular clock rate and a second input 112 connected to line 87 for receiving therefrom the eighth counting signal from the counter 76. With the flip-flop 40 in its first or set state, an enabling signal will be supplied to the reset "R" terminal at the end of the first "8" count since both inputs to the AND gate will be enabled at the end of the eighth count. The reset "R" terminal of the flip-flop 42 is connected to line 114 for receiving from the memory 10 a signal, designated EOM, indicating that the entire message has been transmitted. An enabling signal on line 114 will shift the flip-flop 42 to its second or reset state and thereby stop the counter 78 and the enabling counting signals generated by the counter 76.

As previously described, a transmit signal from switch 32 shifts the flip-flops 24, 40 and 42 to their first or set states, the resulting disabling signal from the "0" output terminal of the flip-flop 24 to the memory input AND gates 20 inhibiting further input of data to the memory 10. The resulting disabling signal from the "0" output terminal of the flip-flop 40 to the memory output AND gates 50–56 similarly inhibits output of data from the memory 10 to the receiving station 66. The output terminal "1" of the flip-flop 40 supplies an enabling signal to the input 93 of the AND gate 92, and the output terminal "1" of the flip-flop 42 supplies an enabling signal to the input 68 of AND gate 70 to start the counter 76 and the sequence of enabling signals generated by the counter 76.

If, as indicated previously, it is assumed that flip-flop 44 is in set state when the initial transmit signal is generated by the switch 32, a high or enabling signal will be supplied from its "1" output terminal to input 94 of the AND gate 92. On count 1, input 90 will also be enabled, the result being a high or "1" signal from AND gate 92 to OR gate 62 and the receiving station 66. There will be no interfering signals from the memory 10 since AND gates 50–56 have disabling signals supplied thereto from flip-flop 40. On counts 2–7, AND gate 92 and AND gates 51–56 will not transmit since they all have disabling signals supplied thereto, line 80 being disabled on counts 2–8 and the "0" output terminals of flip-flop 40 disabling AND gates 50–56 on counts 1–7. At the end of count 8, however, enabling signals will be present at both inputs 110 and 112 of AND gate 108, the result being an enabling signal at the reset "R" terminal and a shifting of the flip-flop 40 to its second or reset state. This shifting of the flip-flop 40 to its reset state results in the supplying of a disabling signal to the input 93 of AND gate 92 and the supplying of an enabling signal to the second inputs of the AND gate 50–56. On count 8, parity generator 60, which has been counting the number of "1's" during the previous seven counts, and AND gate 57 will generate and pass a proper parity signal. If odd parity is assumed, the first eight counts after the transmit signal will result in the transmission of "10000000" to the receiving station as identifying data. After count 8 and the concomitant shift of flip-flop 40, the data message stored in the memory 10 can be transmitted a bit at a time through the sequentially enabled AND gates 50–56 to OR gate 62 and the receiving station. It is essential that the counting signal supplied to AND gate 108 be equal to or later in sequence than the counting signal supplied to AND gate 92 so that the identifying signal can be transmitted by AND gate 92 before a disabling signal is supplied to its input 93.

At the end of the transmission, an end of message signal EOM is generated and transmitted over line 114 to shift flip-flop 42 to its reset state and thereby stop the counter 76. If an ACKNOWLEDGE signal is not received on line 104, switch 32 can be actuated again, or a signal designated REPEAT can be supplied over line 120 to the OR gate 34 to cause "one-shot" 36 to again supply enabling signals to the flip-flops 24, 40 and 42. This signal will have no effect on flip-flop 24 since it has remained in its set condition, but the signal will shift flip-flops 40 and 42 back to their set positions for a complete retransmission of the identifying data and the data message. Since flip-flop 44 is still in its set state, the identification data will remain "10000000." The retransmission will be in all respects identical to the original transmission.

It will, of course, be appreciated that the signal supplied over line 120 to the OR gate 34 may be generated by the receiving station as a REPEAT signal, indicating that the message has been received, but not accepted for some reason. Alternatively, it may be generated as a result of manual action by the operator or automatically by the transmitting station after a predetermined waiting period during which an ACKNOWLEDGE signal is not received.

If, however, the receiving station receives the message without apparent error and transmits a message acknowledgement signal which is received over line 104, flip-flop 24 will be shifted to its reset state to enable entry of data to the memory 10, and flip-flop 44 will be shifted to its second or reset state. The reason for this shifting of flip-flop 44 is that the enabling signal on line 104 will be supplied to both AND gates 100 and 102, but transmitted only by AND gate 100 since AND gate 100 has an enabling signal supplied thereto from the "1" output terminal and AND gate 102 has a disabling signal supplied thereto from the "0" output terminal. As a result, the next data message transmitted to the receiving station will be prefaced by the identifying data "00000001" since the "1" output terminal will be disabled after the shift to the reset state. The next message acknowledgement signal will shift the flip-flop 44 back to its set state, and the following data message will be prefaced by "10000000."

From the foregoing, it will be seen that no matter how many times a message is retransmitted, it will always have the same identifying data, either "10000000" or "00000001," ahead of the data message. It can therefore be readily identified and rejected by the receiving station as a retransmitted message if it has already been received and accepted. On the other hand, successive messages having identical content can be recognized as such and both accepted since one will be identified by "10000000' and the other will be identified by "00000001."

A modified data message control system of this invention is illustrated by FIG. 2 in which elements identical to those of FIGS. 1*a* and 1*b* are indicated by primed numerals. It is conceivable that the operator could cause a second transmission before the acknowledgement from the receiving station is received at the transmitting station. The second transmission may also be acknowledged by a signal causing the flip-flop 44 to change its state again. This means that the next independent data message may be rejected by the receiving station since it will be prefaced by the same identifying data as the previous message. To prevent such an occurrence, the "1" output of flip-flop 24' is connected by line 125 to both AND gates 100' and 102'. Since the first message acknowledgement signal will shift flip-flop 24' to its reset state, a second message acknowledgement signal can not shift the state of the flip-flop 44' since the inputs connected to the "1" terminal of flip-flop 24' will be disabled and will therefore prevent transmission of the second acknowledgement signal to the flip-flop 44'. It is also possible that a second transmission by the operator may arrive at the receiving station incorrectly, the receiving station thereby generating a repeat signal. To inhibit such a repeat signal, the embodiment of FIG. 2 further includes an AND gate 126 and a flip-flop 128. Line 104' is connected to the reset "R" terminal of the flip-flop 128, and the set "S" terminal is connected to the output of the "one-shot" 36'. The "1" output terminal of the flip-flop 128 is connected to one input of the AND gate 126, and the other input of the AND gate 126 is connected to receive the REPEAT signal on line 120'. The output of the AND gate 126 is connected as an input to the OR gate 34'. The ACKNOWLEDGE signal on line 104' in response to the first transmission shifts flip-flop 128 to its reset state, the resulting low output signal from its "1" output disabling AND gate 126 and thereby inhibiting the REPEAT signal. The next transmit signal from the "one-shot" 36' will shift the flip-flop 128 to its set position to enable AND gate 126 for the passage of REPEAT signals.

From the foregoing, it will be appreciated that the data message control system of this invention is capable of identifying successive data messages such that the receiving station can readily distinguish between successive transmissions of an unchanged data message and successive transmission of different, but possibly identical, data messages.

It will be understood that the invention is not limited to the specific details of construction and arrangement of the embodiments illustrated and described herein since changes and modifications will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. In a data handling device having a memory for storing data and input means for supplying data messages to the memory for subsequent transmission to a receiving station, a data message control system comprising:

means for receiving at least one transmit signal subsequent to the storage of a data message in the memory, means for receiving from the receiving station a message acknowledgement signal indicating the successful transmission of the data message to the receiving station, means responsive to the initial transmit signal and the subsequent message acknowledgement signal for preventing input of data to said memory from said input means during the period of time between said initial transmit signal and said acknowledgement signal and permitting input of data to said memory from said input means during the period of time between said acknowledgement signal and the next initial transmit signal, means responsive to said initial transmit signal for transmitting predetermined identifying data to the receiving station and thereafter transmitting the data message stored in the memory to the receiving station and responsive to each subsequent transmit signal received prior to said acknowledgement signal for transmitting the same predetermined identifying data to the receiving station and thereafter transmitting the same data message stored in the memory to the receiving station, and means responsive to said message acknowledgement signal for changing said predetermined identifying data such that the next data message transmitted to the receiving station will be identified by different predetermined identifying data.

2. A data message control system as defined by claim 1 further comprising bi-stable circuit means for establishing predetermined identifying data such that predetermined identifying data in a first form is transmitted when said bi-stable circuit means is in its first stable state and predetermined identifying data in a second form is transmitted when said bi-stable circuit means is in its second stable state, said means for changing said predetermined identifying data comprising means shifting the state of said bi-stable circuit means in response to each message acknowledgement signal.

3. A data message control system as defined by claim 2 wherein said means for controlling input of data to the memory comprises:

at least one memory input AND gate, a first input of said memory input AND gate communicating with the data input means for receiving data input signals therefrom and the output of said memory input AND gate communicating with the memory for supplying data input signals thereto, and bi-stable circuit means, means shifting said bi-stable circuit means to its first stable state in response to each initial transmit signal and means shifting said bi-stable circuit mean to its second stable state in response to the message acknowledgement signal following each initial transmit signal, a second input of said memory input AND gate communicating with said bi-stable circuit means such that transmission of data input signals to the memory is inhibited when said bi-stable circuit means is in its first stable state.

4. A data message control system as defined by claim 2 wherein said bi-stable circuit means for establishing predetermined identifying data has first and second input terminals and respective first and second output terminals, and wherein said data message control means further comprises:

a first AND gate having an output connected to said first input terminal only of said bi-stable circuit means, and a second AND gate having an output connected to said second input terminal only of said bi-stable circuit means, said first AND gate having a first input connected to said second output terminal of said bi-stable circuit means, said second AND gate having a first input connected to said first output terminal of said bi-stable circuit means, and said first and second AND gates each having a second input connected to receive message acknowledgement signals from the receiving station, the feedback from said output terminals to said AND gates causing the state of said bi-stable circuit means to alternate in response to successive message acknowledgement signals.

5. A data message control system as defined by claim 1 further comprising:

a first bi-stable circuit means, means alternating the state of said first bi-stable circuit means between first and second stable states in response to successive message acknowledgement signals, a second bi-stable circuit means, means shifting said second bi-stable circuit means to its first stable state in response to each transmit signal and means shifting said second bi-stable circuit means to its second stable state a predetermined period of time after each transmit signal, an AND gate having a first input communicating with said first bi-stable circuit means for receiving therefrom an indication of the state of said first bi-stable circuit means in the form of the presence or absence of a signal, the output of said AND gate communicating with the receiving station, a second input of said AND gate communicating with said second bi-stable circuit means such that transmission of signals to the receiving station is inhibited when said second bi-stable circuit means is in its second stable state, and at least one memory output AND gate, a first input of said memory output AND gate communicating with the memory for receiving data output signals therefrom and the output of said memory output AND gate communicating with the receiving station for supplying data output signals thereto, a second input of said memory output AND gate communicating with said second bi-stable circuit means such that transmission of data output signals to the receiving station is inhibited when said second bi-stable circuit means is in its first stable state, whereby a signal indicating the state of said first bi-stable circuit means and thereby serving as predetermined identifying data may be communicated to the receiving station when said second bi-stable circuit means is in its first stable state and the data message stored in the memory may be transmitted when said second bi-stable circuit means is in its second stable state.

6. A data message control system as defined by claim 5 wherein said means for controlling input of data to the memory comprises:

at least one memory input AND gate, a first input of said memory input AND gate communicating with the data input means for receiving data input signals therefrom and the output of said memory input AND gate communicating with the memory for supplying data input signals thereto, and a third bi-stable circuit means, means shifting said third bi-stable circuit means to its first stable state in response to each initial transmit signal and means shifting said third bi-stable circuit means to its second stable state in response to the message acknowledgement signal following each initial transmit signal, a second input of said memory input AND gate communicating with said third bi-stable circuit means such that transmission of data input signals to the memory is inhibited when said third bi-stable circuit means is in its first stable state.

7. A data message control system as defined by claim 1 further comprising:

a first bi-stable circuit means having first and second input terminals and respective first and second output terminals, a first AND gate having an output connected to said first input terminal only of said first bi-stable circuit means, a second AND gate having an output connected to said second input terminal only of said first bi-stable circuit means, said first AND gate having a first input connected to said second output terminal of said first bi-stable circuit means, said second AND gate having a first input connected to said first output terminal of said first bi-stable circuit means, and said first and second AND gates each having a second input connected to receive message acknowledgement signals from the receiving station such that each message acknowledgement signal will be transmitted through one only of said first and second AND gates to shift the state of said first bi-stable circuit means, a second bi-stable circuit means having first and second input terminals and respective first and second output terminals, means for supplying transmit signals to said first input terminal of said second bi-stable circuit means to shift said second bi-stable circuit means to its first stable state and means responsive to transmit signals for supplying a signal to said second input terminal of said second bi-stable circuit means at a predetermined period of time after each transmit signal to shift said second bi-stable circuit means to its second stable state, a third AND gate having a first input connected to one of the output terminals of said first bi-stable circuit means for receiving therefrom an indication of the state of said first bi-stable circuit means in the form of the presence or absence of a signal, the output of said AND gate communicating with the receiving station, a second input of said third AND gate communicating with said first output terminal said second bi-stable circuit means such that transmission of signals to the receiving station is inhibited when said second bi-stable circuit means is in its second stable state, and at least one memory output AND gate, a first input of said memory output AND gate communicating with the memory for receiving data output signals therefrom and the output of said memory output AND gate communicating with the receiving station for supplying data output signals thereto, a second input of said memory output AND gate communicating with said second output terminal of said second bi-stable circuit means such that transmission of data output signals to the receiving station is inhibited when said second bi-stable circuit means is in its first stable state, whereby a signal indicating the state of said first bi-stable circuit means and thereby serving as predetermined identifying data may be communicated to the receiving station when said second bi-stable circuit means is in its first stable state and the data message stored in the memory may be transmitted when said second bi-stable circuit means is in its second stable state.

8. A data message control system as defined by claim 7 further comprising means for generating a cyclic sequence of regular counting signals, said memory output AND gate having a third input connected to said counting signal generating means for receiving therefrom a unique one of the counting signals, and said third AND gate having a third input connected to said counting signal generating means for receiving therefrom a predetermined one of the counting signals.

9. A data message control system as defined by claim 8 further comprising means responsive to transmit signals for starting said counting signal generating means, said second input terminal of said second bi-stable circuit means being connected to said counting signal generating means so as to receive therefrom a predetermined one only of the counting signals, said second bi-stable circuit shifting to its second stable state upon receipt of the first such signal, said predetermined counting signal supplied to said third AND gate being earlier in the sequence of counting signals than said predetermined counting signal supplied to said second input terminal of said second bi-stable circuit means so that the indication of the state of said first bi-stable circuit means is communicated to the receiving station before said second bi-stable circuit is shifted to its second state.

10. A data message control system as defined by claim 9 wherein said means for controlling input of data to the memory comprises:

at least one memory input AND gate, a first input of said memory input AND gate communicating with the data input means for receiving data input signals therefrom and the output of said memory input AND gate communicating with the memory for supplying data input signals thereto, and a third bi-stable circuit means, means shifting said third bi-stable circuit means to its first stable state in response to each initial transmit signal and means shifting said third bi-stable circuit to its second stable state in response to the message acknowledgement signal following each initial transmit signal, a second input of said memory input AND gate communicating with said third bi-stable circuit means such that transmission of data input signals to the memory is inhibited when said third bi-stable circuit is in its first stable state.

11. A data message control system as defined by claim 10 wherein said first and second AND gates each have a third input connected to said third bi-stable circuit means such that only a first message acknowledgement signal following one or more transmit signals is transmitted to said first bi-stable circuit means, thereby assuring that successive data messages will be identified by different predetermined identifying signals.

12. A data message control system as defined by claim 11 further comprising manually operable means for supplying a transmit signal to said second and third bi-stable circuit means and said means for starting said counting signal generating means.

13. A data message control system as defined by claim 12 further comprising means for receiving from the receiving station a signal indicating the unsuccessful transmission of the data message and supplying the signal as a transmit signal to said second and third bi-stable circuit means and said means for starting said counting signal generating means.

14. A data message control system as defined by claim 13 wherein said means for starting said counting signal generating means includes a fourth bi-stable circuit means.

* * * * *